No. 670,908. Patented Mar. 26, 1901.
F. S. WEATHERLY.
POWER TRANSMITTING DEVICE.
(Application filed July 17, 1899.)
(No Model.) 3 Sheets—Sheet 1.
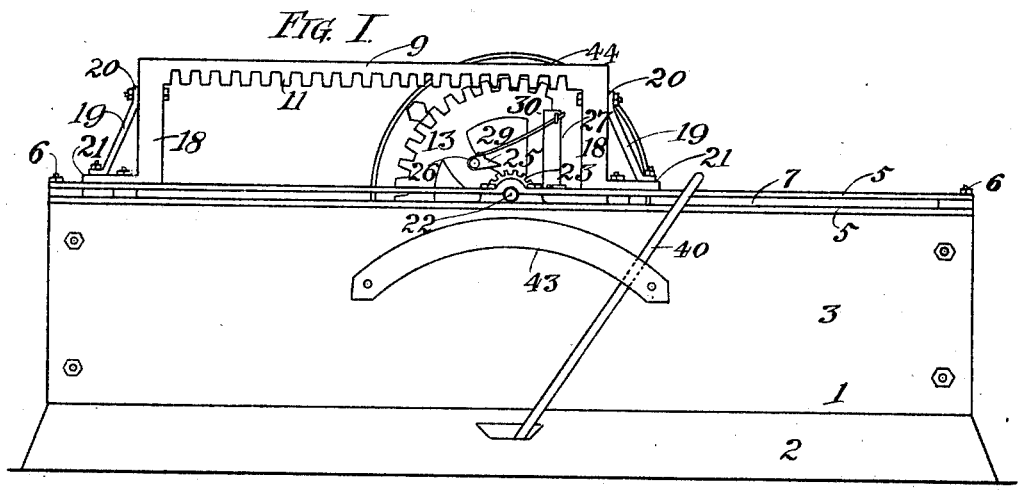
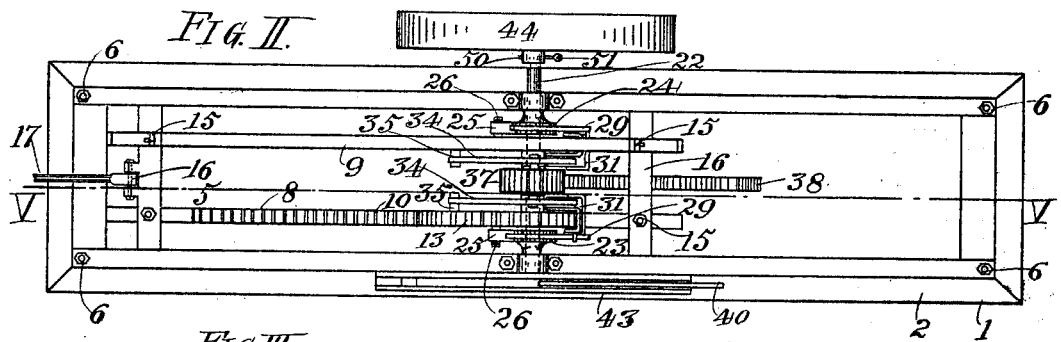
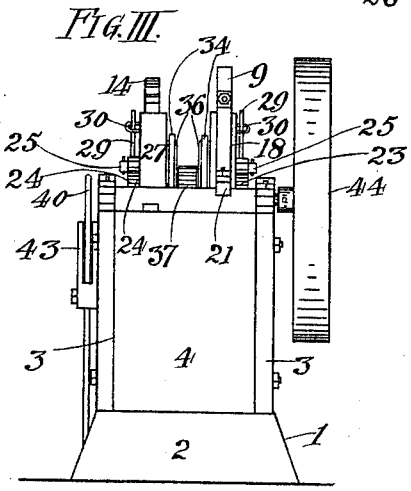
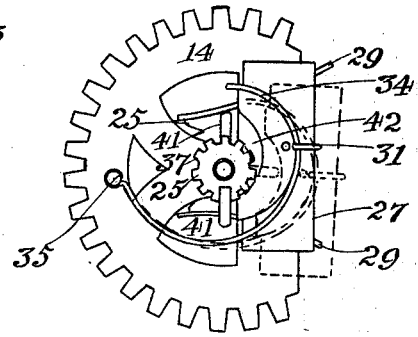

No. 670,908. Patented Mar. 26, 1901.
F. S. WEATHERLY.
POWER TRANSMITTING DEVICE.
(Application filed July 17, 1899.)
(No Model.) 3 Sheets—Sheet 2.
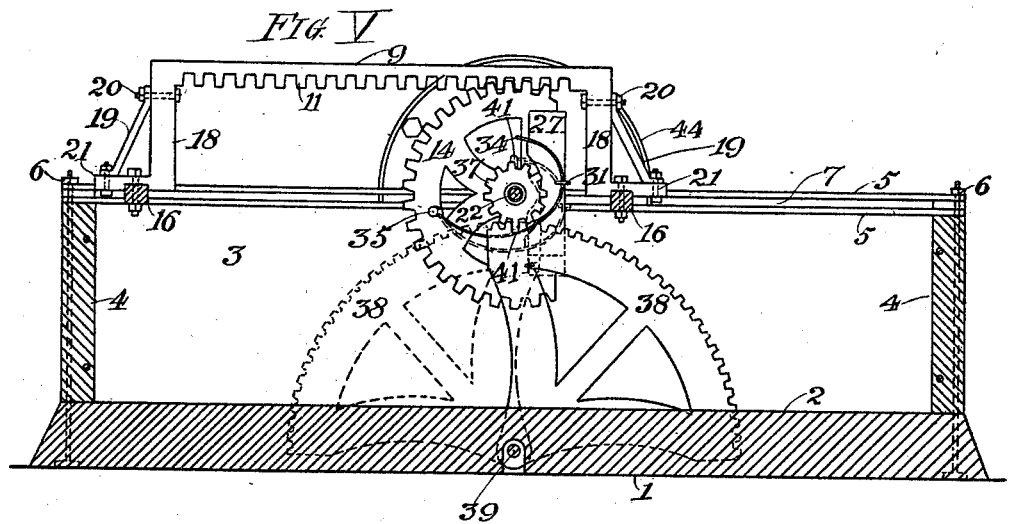
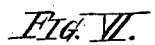  
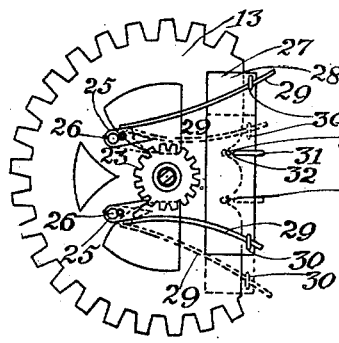 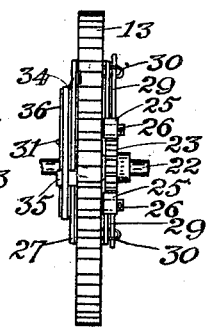 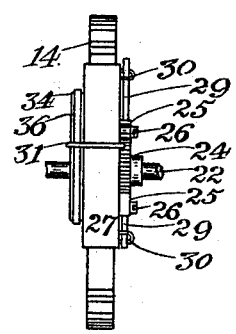
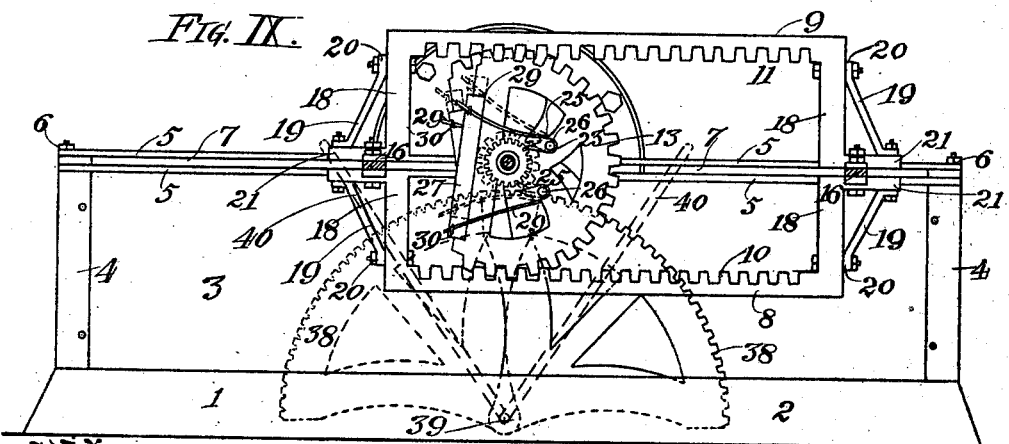

No. 670,908. Patented Mar. 26, 1901.
F. S. WEATHERLY.
POWER TRANSMITTING DEVICE.
(Application filed July 17, 1899.)
(No Model.) 3 Sheets—Sheet 3.
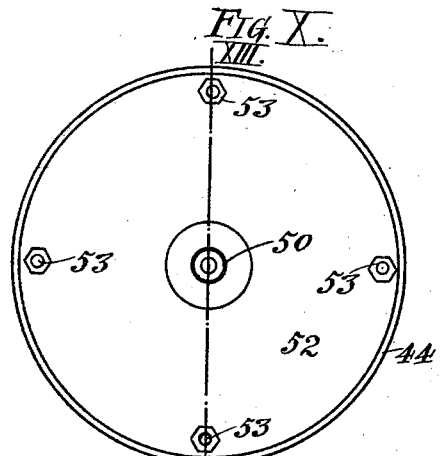
FIG. X.
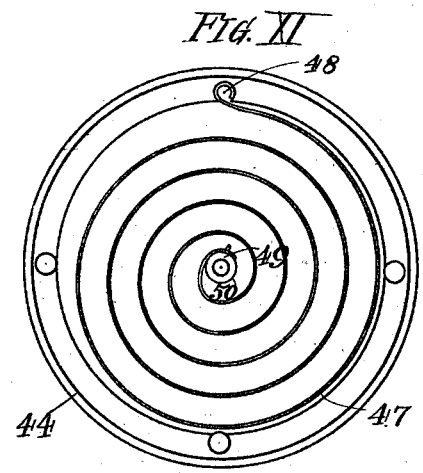
FIG. XI.
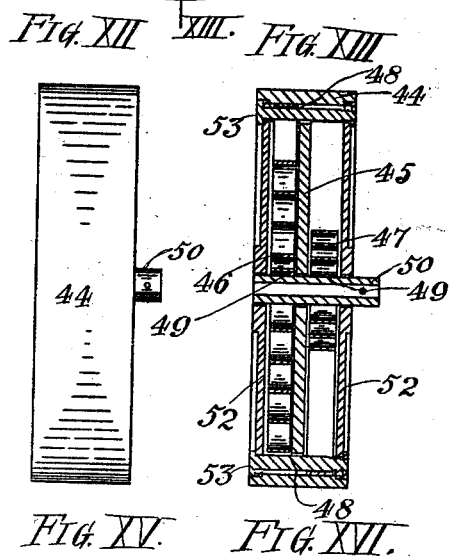
FIG. XII. FIG. XIII.
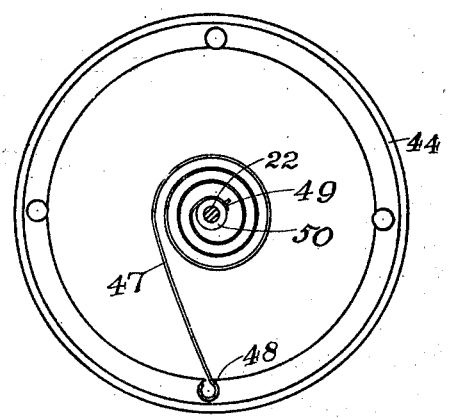
FIG. XIV.
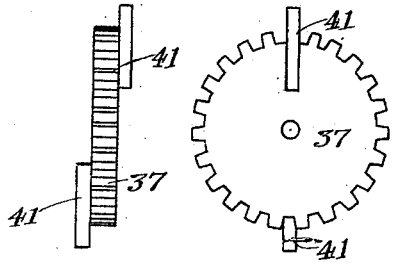
FIG. XV. FIG. XVI.
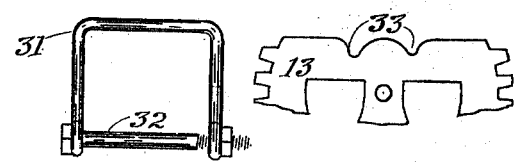
FIG. XVII. FIG. XVIII.
Witnesses.
Robt. Train
J. A. Roelofs
Inventor.
F. S. Weatherly
by Knight Bros.
Attorneys.

UNITED STATES PATENT OFFICE.

FRANK S. WEATHERLY, OF LOS ANGELES, CALIFORNIA.

POWER-TRANSMITTING DEVICE.

SPECIFICATION forming part of Letters Patent No. 670,908, dated March 26, 1901.

Application filed July 17, 1899. Serial No. 724,128. (No model.)

*To all whom it may concern:*

Be it known that I, FRANK S. WEATHERLY, a citizen of the United States, residing at Los Angeles, in the county of Los Angeles and State of California, have invented certain new and useful Improvements in Power-Transmitting Devices, of which the following is a full, clear, and exact description, reference being had to the accompanying drawings, which form a part of this specification.

My invention relates to a power-transmitting device in which reciprocating motion is changed to rotary motion, also means for reversing the rotary motion and means for dispensing with any shock or sudden start in changing from the reciprocating motion to the rotary motion; and my invention consists in certain features of novelty hereinafter described and claimed.

In my invention I combine a yielding pulley with the shaft and the mechanism of a rack-and-pinion power-transmitting device, thereby to convert reciprocating motion into rotary motion with great economy of the initial energy and without shocks and jars.

In general terms, my invention comprises the combination of a shaft, two toothed wheels loosely mounted on said shaft, two ratchet-wheels fixed on said shaft, pawls on said toothed wheels for operating the ratchets, respectively, to rotate the shaft in one direction, two racks connected together and meshing with said toothed wheels, respectively, to simultaneously rotate the one in the one direction and the other in the other direction to actuate the pawls to turn the shaft continuously in one direction, and a yielding pulley mounted on the shaft. The racks constitute reciprocating means for rotating back and forth the power-transmitting wheels.

My invention also includes a reversing mechanism which is constituted by guides on said power-transmitting wheels, respectively, and pawl-carriers or yokes, one for each of said guides and each furnished with two pawls and both being arranged to be shifted on said guides, respectively, to simultaneously shift the pawls to simultaneously reverse the direction of rotation of the shaft.

Figure I is a side elevation of my improved device. Fig. II is a top view. Fig. III is an end view. Fig. IV is a detail view showing method of reversing. Fig. V is a longitudinal section taken on line V V, Fig. II. Fig. VI is a side elevation of one of the segmental gear-wheels. Fig. VII is an edge view of one of the segmental gear-wheels. Fig. VIII is an edge view of one of the segmental gear-wheels, showing reversing device. Fig. IX is a side elevation of my improved device, showing the side of the bed-plate removed. Fig. X is a side elevation of my improved balance power-wheel. Fig. XI is a side elevation of the balance power-wheel with side plate removed. Fig. XII is an edge view of the balance power-wheel. Fig. XIII is a transverse section taken on line XIII XIII, Fig. X. Fig. XIV is a side elevation of the balance power-wheel, showing side plate removed and balance-spring contracted. Fig. XV is an edge view of the reversing gear-wheel. Fig. XVI is a side elevation of the reversing gear-wheel. Fig. XVII is a plan view of the clevis for connecting the reversing-yoke with the segmental gear-wheel. Fig. XVIII is a detail side elevation of the segmental gear-wheel.

Referring to the drawings, 1 represents a bed-plate of any approved construction, having a base 2, vertical sides 3, and ends 4.

5 represents upper and lower guide-plates extending the full length of the bed-plate, resting upon the upper edge of the sides 3 and secured thereto by means of bolts 6, said bolts preferably extending through the base of the bed-plate and through the sides 3. The guide-plates 5 are placed a short distance apart, leaving a horizontal working space 7.

8 9 represent my double reciprocating power-rack, having teeth 10 11, which engage the segmental gear-wheels 13 14. The racks 8 9 are placed some distance apart and secured at 15 to cross-heads 16. The cross-heads 16 extend across the bed-plate, with their ends resting in the horizontal space 7 between the upper and lower guide-plates 5.

17 represents a piston-rod connected with one of the cross-heads 16, by which reciprocating motion is imparted to the racks 8 9. The racks 8 9 are placed some distance apart, both horizontally and vertically, with the teeth of one rack presented upwardly and those of the other rack presented downwardly. The racks are provided with legs 18, which are bolted to the cross-heads 16, said racks being strengthened by means of braces 19, connecting the racks at 20 with L-shaped projections 21, said projections being a right-angle continuation of the legs 18 and resting upon and secured to the cross-heads 16. The segmental power-wheels 13 14 are loosely mounted upon the power-shaft 22, each of said segmental power-wheels engaging the teeth of its respective rack, so that as the racks are reciprocated in the bed-plate the segmental power-wheels will partially rotate upon the power-shaft 22 in opposite directions.

23 24 represent ratchet-wheels fixed to the power-shaft 22 on the outside of the segmental wheels 13 14.

25 represents spring-pawls adapted to engage the teeth of the ratchet-wheels 23 24, said pawls being pivoted to pins 26, extending out from the sides of the segmental power-wheels 13 14, said pawls being so placed on the segmental wheel as to engage the teeth on either side of the ratchet-wheels 23 24, according to circumstances.

27 represents yokes which straddle the non-toothed part 28 of the segmental wheels.

29 represents spring-rods extending from the pawls 25 to the yokes 27, the ends of said spring-rods 29 passing through staples 30 on said yokes, the result being that as the yokes 27 are shifted upon the segmental gear-wheel (see dotted line, Fig. VI) the respective pawls 25 will either be thrown into contact or out of contact with the ratchet-wheels 23 24.

31 represents a clevis connected with the yoke 27, said clevis having a bolt 32, which extends through the yoke 27. The yoke is held in the position to which it is thrown by means of the bolt 32, passing into notches 33 in the segmental gear-wheels 13 14, said yoke being firmly pressed down upon the segmental gear-wheels by means of a curved spring 34, having one end fixed at 35 to the segmental gear-wheels and its opposite end curved over shoulders 36 on the yokes 27, the clevis 31 also extending over the free end of the spring 34, thus holding it in position.

37 represents a reversing gear-wheel loosely mounted on the power-shaft 22 between the segmental gear-wheels 13 14. The wheel 37 meshes with a segmental rack 38, which is pivoted at 39 to the bed-plate.

40 represents a lever for operating rack 38. 41 represents lugs on each side of the reversing gear-wheel 37, the outer ends of said lugs as the reversing gear-wheel 37 is rotated engaging within a semicircular recess 42 on the inner face of the yokes 27, so that a single revolution of the reversing gear-wheel 37 by the manipulation of the lever 40 and the segmental rack 38 will cause the lugs 41 to enter the recess 42 in the yoke 27 and by pressure change its position. (See Fig. IV.) As the position of the yoke is changed the pawls 25 are changed and the power-shaft 22 is compelled to travel in the opposite direction.

43 represents a bar for confining and guiding the lever 40. In order to dispense with any shock or jar in starting the motor, I provide an improved balance power-wheel 44, said wheel being hollow and having a central division-plate 45. On each side of the plate 45 are located coil-springs 46 47, said springs having their outer ends secured at 48 to the inner side of the wheel 44 and their inner ends secured at 49 to a sleeve 50, upon which the wheel 44 is loosely mounted and around which it revolves. The sleeve 50 is fixed to the power-shaft 22 by means of a pin or bolt 51.

52 represents plates secured to the wheel 44 on the outside of the springs for protecting the same, said plates being held in position by means of bolts 53. The springs 46 47 on each side of the plate 45 are arranged to be wound in opposite directions, the operation being such that as the power-shaft 22 is revolved it rotates the sleeve 59 and commences to contract either the spring 46 or the spring 47, according to the direction of its rotation, without turning the power-wheel 44. As the spring is gradually contracted the pull of the same upon the wheel 44 will cause said wheel to rotate slowly at first and finally revolve with the same speed as the power-shaft, the spring at the opposite side at the same time being uncoiled and ready for the reversal of the operation when the motion of the power-shaft is reversed. By the use of my improved balance power-wheel I am enabled to transmit power therefrom without any sudden blow or jerk, as might be the case were the power-wheel keyed directly onto the power-shaft.

I claim as my invention—

1. In a power-transmitting device the combination of a base; a power-shaft journaled to the base; a balance power-wheel having a central sleeve which is fixed to the power-shaft around which the balance-wheel revolves; coil-springs located within the balance-wheel, said springs having their outer ends secured to the balance-wheel and their inner ends secured to the sleeve and being coiled in opposite directions; cross-heads adapted to operate in ways in said base; upper and lower toothed racks secured to said cross-heads; gear-wheels loosely mounted on the power-shaft and meshing with the upper and lower racks respectively; ratchet-wheels secured to the shaft; and pawls for connecting the gear-wheels with the ratchet-wheels substantially as set forth.

2. In a power-transmitting device, the reversing mechanism set forth comprising gear-wheels loosely mounted on the power-shaft of said device; pawls on the gear-wheels; ratchet-wheels fixed on the power-shaft; yokes on the gear-wheels; springs connecting the yokes with the gear-wheels; and a wheel loosely mounted on said power-shaft and adapted and arranged to move the yokes on the gear-wheels.

3. The combination of a suitable base; a power-shaft journaled to the base; gear-wheels loosely mounted on the power-shaft; pawls on the gear-wheels; ratchet-wheels rigidly mounted on the power-shaft; guides on the base; cross-heads adapted to the guides; racks secured to the cross-heads; a power-wheel mounted on the power-shaft; and an elastic connection by means of which motion is communicated from the power-shaft to the power-wheel.

4. In a power-transmitting device the combination, of a suitable base, a power-shaft journaled to the base, segmental gear-wheels loosely mounted upon the power-shaft, racks for engaging said gear-wheels, ratchet-wheels fixed to the power-shaft, double pawls pivoted to the segmental gear-wheels and adapted to engage the ratchet-wheels, yokes mounted on the segmental gear-wheels, springs connecting the yokes with the pawls for throwing them into or out of engagement with the ratchet-wheels and means for sliding said yokes upon the segmental gear-wheels, substantially as set forth.

5. In a power-transmitting device the combination, of a suitable base, a power-shaft journaled to the base, segmental gear-wheels loosely mounted on the power-shaft, ratchet-wheels fixed to the power-shaft, pawls pivoted to the gear-wheels, yokes mounted on the gear-wheels, spring-rods connecting the pawls with the yokes, a reversing-wheel mounted on the shaft between the segmental gear-wheels and lugs on the reversing-wheel adapted to engage the yokes and change their position on the segmental gear-wheels, thus throwing the pawls into or out of engagement with the ratchet-wheels, substantially as set forth.

6. In a power-transmitting device the combination, of a suitable base, a power-shaft journaled to the base, notched gear-wheels loosely mounted on the power-shaft, racks for operating said gear-wheels, ratchet-wheels fixed to the power-shaft, yokes on the gear-wheels, a clevis secured to the yokes, pawls pivoted to the gear-wheels, spring-rods connecting the pawls with the yokes, means for moving the yokes and the pawls, and a bolt on the clevis adapted to engage the notches in the segmental gear-wheels, substantially as set forth.

7. In a power-transmitting device the combination, of a suitable base, a power-shaft mounted thereon, segmental gear-wheels loosely mounted on the power-shaft, racks adapted to engage the segmental gear-wheels, ratchet-wheels fixed to the power-shaft, pawls for engaging said ratchet-wheels, yokes on the segmental gear-wheels, said yokes having shoulders, means for connecting the pawls with the yokes, and springs adapted to engage said shoulders and to hold the yokes in position upon the segmental gear-wheels, substantially as set forth.

8. In a power-transmitting device the combination, of a suitable base, a power-shaft journaled to the base, segmental gear-wheels loosely mounted on the power-shaft, racks for engaging the segmental gear-wheels, ratchets fixed to the power-shaft, pawls for engaging said ratchets, yokes mounted on the segmental gear-wheels, means for connecting the pawls with said yokes, a reversing gear-wheel loosely mounted on the shaft, lugs on the reversing-wheel for engaging the yokes, a segmental rack engaging the reversing gear-wheel and a lever operating said segmental rack, substantially as set forth.

9. In a power-transmitting device, the combination, of a power-shaft, a wheel loosely mounted thereon, lugs on the opposite sides of the wheel and diametrically opposite to each other, and means in connection with the wheel whereby said lugs are caused to reverse the operation of the power-transmitting device, substantially as set forth.

10. In a power-transmitting device the combination, of a power-shaft, segmental gear-wheels mounted thereon, racks engaging said segmental gear-wheels, ratchet-wheels mounted on the power-shaft, pawls for engaging the ratchet-wheels, yokes on the segmental gear-wheels to which the pawls are connected, semicircular recesses in said yokes, a reversing-wheel loosely mounted on the power-shaft, lugs on the reversing-wheel for engaging the recesses on the yokes for changing the position of said pawls and means for rotating said reversing-wheel, substantially as set forth.

11. A power-transmitting device comprising a base; a shaft journaled to the base; two power-transmitting wheels loosely mounted on the shaft and furnished respectively with a guide; a ratchet-wheel fixed on the shaft for one of said power-transmitting wheels; a ratchet fixed on the shaft for the other power-transmitting wheel; a pawl-carrier mounted on one of said guides; two reversely-arranged pawls carried by said carrier for alternately engaging one of said ratchet-wheels; a pawl-carrier on the other guide; two reversely-arranged pawls on said carrier for actuating the other ratchet-wheel; means for simultaneously shifting said carriers on said guides to reverse their pawls respectively; reciprocating means on one side of the shaft for rotating one of said wheels back and forth; and reciprocating means connected with said first-named reciprocating means and engaging the other power-transmitting wheel on the other side of the shaft to rotate said other wheel back and forth.

12. The combination of a suitable base; a power-shaft journaled to the base; two wheels loosely mounted on the power-shaft; pawls on said loosely-mounted wheels; two ratchet-wheels fixed on the power-shaft; guides on the base; cross-heads adapted to the guides; means in connection with the cross-heads whereby the two loosely-mounted wheels are caused to oscillate on the power-shaft; a power-wheel mounted on the power-shaft; and an elastic connection by means of which motion is communicated from the power-shaft to the power-wheel.

FRANK S. WEATHERLY.

Witnesses:
J. W. KEMP,
JAS. E. KNIGHT.